April 19, 1938. E. D. EBY 2,114,875

HIGH VOLTAGE BUSHING

Filed Feb. 27, 1937

Inventor:
Eugene D. Eby,
by Harry E. Dunham
His Attorney.

Patented Apr. 19, 1938

2,114,875

UNITED STATES PATENT OFFICE 2,114,875

HIGH VOLTAGE BUSHING

Eugene D. Eby, Pittsfield, Mass., assignor to General Electric Company, a corporation of New York Application February 27, 1937, Serial No. 128,221

4 Claims. (Cl. 173—318)

My invention relates to high voltage bushings of the type which comprises a hollow casing surrounding a conductor and filled with an insulating liquid. Bushings of this type are commonly arranged to extend through openings in the covers of casings for electrical apparatus such as high voltage transformers and circuit breakers. A considerable amount of auxiliary apparatus must often be mounted on the cover of such casings and it is therefore desirable that a bushing be so constructed that the opening required for it in the cover of the casing be as small as possible without sacrificing at the same time the electrical or mechanical strength of the bushing. High voltage bushings of the liquid-filled type commonly include upper and lower porcelain sections spaced apart by an intermediate metal section. The ends of the bushing are closed by end caps and the joints between the caps and the porcelain and metal sections of the bushing are sealed with suitable gaskets to prevent leakage of the insulating liquid.

The general object of the invention is to provide a high voltage liquid-filled bushing with an improved arrangement of gasketed joints for effectively sealing the bushing to prevent leakage of the liquid.

A further object of the invention is to provide an improved bushing structure which can be mounted through an opening of minimum size in the cover of an electrical apparatus casing. The porcelain parts of a high voltage bushing are of course somewhat fragile, and a still further object of the invention is to provide an improved high voltage bushing structure having some flexibility so as more readily to withstand vibration and shock without breakage.

Figure 1:
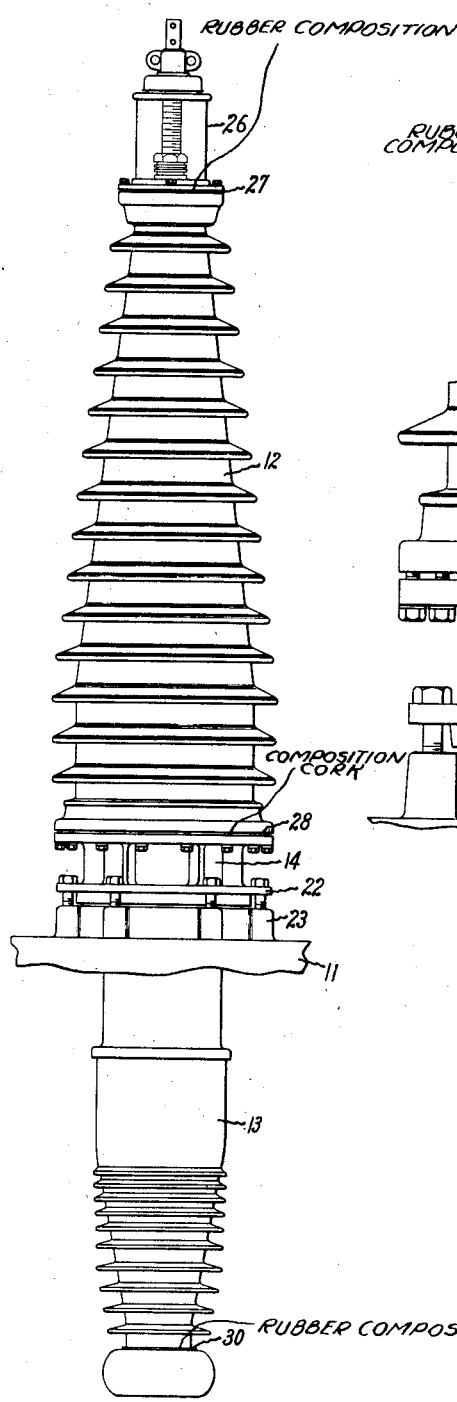
Figure 2:
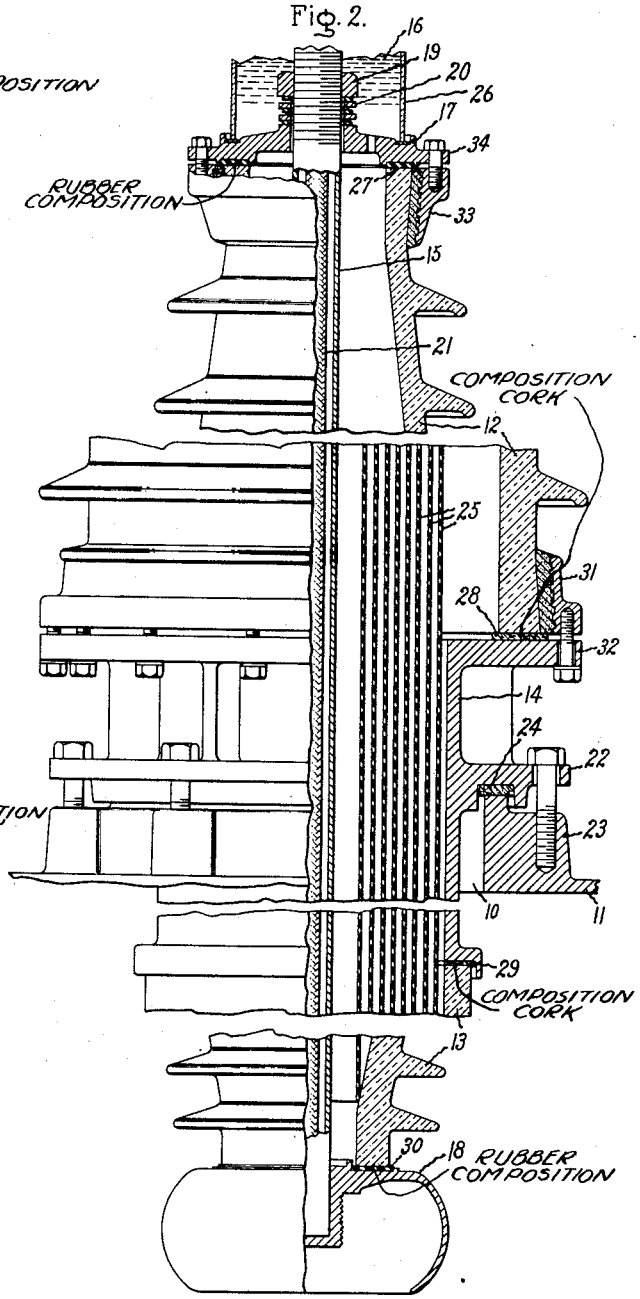

The invention will be better understood from the following description taken in connection with the accompanying drawing in which Fig. 1 is a view of a high voltage liquid-filled bushing constructed in accordance with the invention, and Fig. 2 is an enlarged view of the same bushing, part of the bushing being shown in section and some parts being broken away.

Like reference characters indicate similar parts in both figures of the drawing.

The bushing shown in the drawing is mounted through an opening 10 in a metal support 11 which may be the cover of a liquid-filled electrical apparatus casing, only a small fragment of the casing being shown, however. The bushing includes an outer or upper hollow porcelain section 12 and an inner or lower hollow porcelain section 13 with an intermediate hollow metal section 14, these three sections 12, 13 and 14 forming a housing or casing which surrounds a tubular conductor 15 and which is filled with an insulating liquid 16. The ends of the bushing are closed by metal end caps 17 and 18. One end of the tubular conductor 15 is secured to the inner or lower end cap 18 by brazing or otherwise, and the other end is threaded and provided with a nut 19 and spring washers 20 to clamp the end caps 17 and 18 tightly against the porcelain sections 12 and 13 and hold the conductor, the end caps and the bushing sections together in a mechanically strong unit. A conductive cable 21 may be provided inside the tubular conductor 15 to increase the current-carrying capacity of the bushing. The intermediate hollow section 14 of the bushing is provided with a lateral flange 22 which is bolted to a rim 23 surrounding the opening 10 in the cover 11, a gasket 24 being provided between the flange 22 and the rim 23 to seal this joint. Concentric insulating cylinders 25 may surround the conductor 15 to insulate it more effectively from the hollow metal section 14 of the bushing. A glass expansion chamber 26 mounted on the upper end cap 17 and communicating with the interior of the bushing permits expansion and contraction of the insulating liquid 16 in response to changes in its temperature.

The joints between the sections 12, 13 and 14 of the bushing and the end caps 17 and 18 are sealed by gaskets 27, 28, 29 and 30. The tension of the tubular conductor 15 is applied through the end caps 17 and 18 to all of the gaskets 27, 28, 29 and 30, the pressure thus applied being substantially the same of course on all gaskets. The porcelain sections 12 and 13 of the bushing have broad bases where they meet the intermediate metal section 14 so that the bushing will be mechanically strong. These porcelain sections 12 and 13, however, are tapered gradually away from the intermediate metal section 14 so that the opposite ends of the bushing which have no lateral support may not be unnecessarily heavy. The upper or outer porcelain section 12 is considerably longer than the lower or inner porcelain section 13 because the upper section 12 is surrounded by air and the inner or lower section 13 is immersed in an insulating liquid having a dielectric strength much greater than that of air. Because of the tapered form of the porcelain sections 12 and 13, the gasket 27 between the upper end cap 17 and the upper end of the porcelain section 12 is of considerably smaller size and area than the gasket 28 between the intermediate section 14 of the bushing and the lower end of the porcelain section 12. Likewise, the gasket 30 between the lower end cap 18 and the lower end of the lower porcelain section 13 is of considerably smaller size and area than the gasket 29 between the intermediate metal section 14 and the upper end of the lower porcelain section 13.

The tension of the tubular conductor 15 is alone sufficient to compress the gasket 29 to such extent as effectively to seal the joint between the intermediate section 14 and the upper end of the porcelain section 13 of the bushing. Therefore no additional clamping means is necessary between these two sections of the bushing and the opening 10 in the cover 11 may be of minimum size, that is, this opening 10 need be only slightly larger than any part of the bushing below the supporting flange 22. The pressure applied to the gasket 30 at the lower end of the porcelain section 13 of the bushing is, however, substantially equal to that applied to the gasket 29 and therefore the pressure per unit area applied to the gasket 30 is considerably greater than that applied per unit area to the gasket 29. Any given pressure applied substantially equally to both of the gaskets 29 and 30 would tend to crush the gasket 30 so that it would no longer serve as an effective seal for its joint or else would not compress the gasket 29 sufficiently to make it an effective seal. In order to overcome this difficulty the two gaskets 29 and 30 are formed of different materials requiring different pressures per unit area for effectively sealing the respective joints. The gasket 29 is preferably formed of composition cork and the gasket 30 of a rubber composition. The composition cork used in the gasket 29 is a cellular material consisting of miniature gas-filled cells, each cell being sealed and adhering to adjacent cells. When pressure is applied to such a gasket, the gas in the miniature cells is compressed and maintains a back pressure against the pressure applied to the gasket. If the pressure per unit area applied to the gasket is sufficiently high, the walls of the cells will burst and the cellular mass will collapse and lose its effectiveness as a seal. The tension of the tubular conductor 15 applies a sufficient pressure per unit area on the gasket 30 to make it effective as a seal and at the same time provides a pressure per unit area on the gasket 29 which is sufficient to make it effective as a seal but is not great enough to crush its cells or otherwise destroy it as a sealing material.

The gasket 27 at the upper end of the upper porcelain section 12 is of considerably smaller size and area than the gasket 28 at the lower end of the upper porcelain section 12. These two gaskets are also compressed by the tension in the tubular conductor 15 and, for reasons which have been explained in connection with the gaskets 29 and 30, these gaskets 27 and 28 are formed of different materials, the gasket 27 being preferably formed of a rubber composition and the gasket 28 of a composition cork material. The upper porcelain section 12 is considerably longer and heavier than the lower porcelain section 13 and consequently for mechanical strength the lower end of the upper porcelain section 12 is somewhat larger than the upper end of the lower porcelain section 13. The gasket 28 is consequently of somewhat larger size and area than the gasket 29 and therefore requires a somewhat greater total pressure. The additional pressure may be conveniently applied by providing the lower end of the upper porcelain section 12 with a clamping ring 31 and bolting this to a flange 32 on the intermediate metal section 14. The gasket 28 therefore is compressed by the tension of the tubular conductor 15 and an additional force provided by the clamping ring 31 bolted to the flange 32.

Because the upper porcelain section 12 is considerably longer and larger than the lower porcelain section 13, the gasket 27 is of somewhat larger size and area than the gasket 30 and should have a somewhat larger total pressure applied to it. Both of these gaskets 27 and 30 are compressed by the tension of the tubular conductor 15 and the larger gasket 27 is further compressed by a clamping ring 33 cemented to the upper end of the upper porcelain section 12 and bolted to a flange 34 on the upper end cap 17.

The joints at both ends of the lower porcelain section 13 of the bushing are free of any direct clamping means which would tend to increase the rigidity of the bushing. These joints thus permit some flexibility in the bushing structure and this flexibility permits the bushing more readily to withstand vibration and shock without breakage. The absence of any direct clamping means for the gasket 29 permits the opening 10 in the cover 11 to be of minimum size.

The invention has been explained by describing and illustrating a particular high voltage bushing structure but it will be obvious that changes may be made without departing from the spirit of the invention and the scope of the appended claims.

What I claim as new and desire to secure by Letters Patent of the United States, is:—

1. A liquid-filled bushing including upper and lower porcelain sections and an intermediate metal section, each porcelain section being tapered away from the metal section, a cap closing each end of the bushing, a conductor tensioned between said end caps, a gasket between the lower porcelain section and the intermediate metal section and subject solely to the compressive force of the tensioned conductor, and a gasket of smaller area between the lower porcelain section and its end cap and formed of different material from that of the other gasket to withstand higher compressive force per unit area.

2. A liquid-filled bushing including upper and lower porcelain sections and an intermediate metal section, a cap closing each end of the bushing, a conductor tensioned between said end caps, a gasket between the intermediate section and the lower porcelain section and subject solely to the compressive force of the tensioned conductor, a gasket of larger area between the intermediate section and the upper porcelain section and subject to the compressive force of the tensioned conductor, and means for providing additional compressive force to the latter gasket.

3. A liquid-filled bushing including upper and lower porcelain sections and an intermediate metal section, each porcelain section being tapered away from the metal section, a cap closing each end of the bushing, a conductor tensioned between said end caps, rubber composition gaskets between the upper end cap and the upper porcelain section and between the lower end cap and the lower porcelain section, and cork composition gaskets between the intermediate section and each porcelain section, the area of each cork composition gasket being larger than that of the rubber composition gasket at the other end of the same porcelain section.

4. A liquid-filled bushing including upper and lower porcelain sections and an intermediate metal section, each porcelain section being tapered away from the metal section, a cap closing each end of the bushing, a conductor tensioned between said end caps, rubber composition gaskets between the upper end cap and the upper porcelain section and between the lower end cap and the lower porcelain section, cork composition gaskets of different areas between the intermediate section and the porcelain sections, the cork gasket of smaller area being subject solely to the compressive force of the tensioned conductor, and means for providing additional compressive force to the cork gasket of larger area.

EUGENE D. EBY.